(12) United States Patent
Rubens et al.

(10) Patent No.: US 11,559,856 B2
(45) Date of Patent: Jan. 24, 2023

(54) LASER CUTTER ADAPTED TO CUT ROTATING WORKPIECES

(71) Applicant: Robert Bosch GmbH, Stuttgart (DE)

(72) Inventors: Jeremy Rubens, Palatine, IL (US); Christopher Crowell, Chicago, IL (US)

(73) Assignee: Robert Bosch GmbH, Stuttgart (DE)

( * ) Notice: Subject to any disclaimer, the term of this patent is extended or adjusted under 35 U.S.C. 154(b) by 431 days.

(21) Appl. No.: 16/665,713

(22) Filed: Oct. 28, 2019

(65) Prior Publication Data

US 2021/0121985 A1 Apr. 29, 2021

(51) Int. Cl.
| | |
|---|---|
| *B23K 26/362* | (2014.01) |
| *B23K 26/08* | (2014.01) |
| *B23K 26/00* | (2014.01) |
| *B23K 37/053* | (2006.01) |
| *B23K 26/06* | (2014.01) |
| *B23K 26/042* | (2014.01) |
| *B23K 37/02* | (2006.01) |
| *B23K 26/12* | (2014.01) |

(52) U.S. Cl.
CPC ........ *B23K 26/362* (2013.01); *B23K 26/0096* (2013.01); *B23K 26/042* (2015.10); *B23K 26/0665* (2013.01); *B23K 26/0823* (2013.01); *B23K 26/0876* (2013.01); *B23K 26/128* (2013.01); *B23K 37/0276* (2013.01); *B23K 37/0538* (2013.01)

(58) Field of Classification Search
CPC .. B23K 26/38; B23K 26/0096; B23K 26/362; B23K 26/0823; B23K 26/0876
See application file for complete search history.

(56) References Cited

U.S. PATENT DOCUMENTS

| | | | |
|---|---|---|---|
| 2,017,843 A | 10/1935 | Cuthbert | |
| 2,100,953 A | 11/1937 | Gorton et al. | |
| 2,110,873 A | 3/1938 | Gorton et al. | |
| 4,760,583 A * | 7/1988 | Sasnett | B23K 26/10 |
| | | | 372/109 |
| 4,985,780 A * | 1/1991 | Garnier | B23K 26/0643 |
| | | | 219/121.68 |
| 5,051,558 A * | 9/1991 | Sukhman | B23K 26/128 |
| | | | 219/121.68 |
| 8,794,142 B2 | 8/2014 | Hendriks | |

(Continued)

FOREIGN PATENT DOCUMENTS

| | | | | |
|---|---|---|---|---|
| JP | 53063699 A | * | 6/1978 | |
| JP | 57193289 A | * | 11/1982 | ......... B23K 26/0823 |

*Primary Examiner* — Geoffrey S Evans
(74) *Attorney, Agent, or Firm* — Kelly McGlashen; Maginot, Moore & Beck LLP

(57) ABSTRACT

A desktop laser cutter configured to cut a cylindrical workpiece includes a laser, a cutting head that receives an electromagnetic beam from the laser and emits a cutting beam, and a gantry that supports the cutting head relative to a base plate of the laser cutter housing. The gantry can be actuated to move the cutting head within a plane that is parallel to the baseplate. The cutting head emits the cutting beam in a direction parallel to the plane. In use, the cutting head is disposed side-by-side with the workpiece and the cutting beam is applied to a side of the workpiece that faces a sidewall of the laser cutter housing. The workpiece is supported by the gantry to rotate an amount that is a function of movement of the cutting head in a direction parallel to the plane.

24 Claims, 8 Drawing Sheets

(56) References Cited

U.S. PATENT DOCUMENTS

| | | | |
|---|---|---|---|
| 2010/0116799 A1* | 5/2010 | Momoi | H01M 4/661 |
| | | | 219/121.7 |
| 2011/0095005 A1* | 4/2011 | Brunner | B23K 26/36 |
| | | | 219/121.69 |
| 2014/0014634 A1* | 1/2014 | Liu | B23K 26/361 |
| | | | 219/121.68 |
| 2017/0065840 A1* | 3/2017 | Shih | A62C 3/00 |
| 2017/0235293 A1 | 8/2017 | Shapiro et al. | |
| 2019/0118290 A1 | 4/2019 | Li | |

\* cited by examiner

LASER CUTTER ADAPTED TO CUT ROTATING WORKPIECES

BACKGROUND

A computer numerical controlled (CNC) machine is a machine that is used to add or remove material from a workpiece under the control of a computer. The CNC machine may include one or more motors or other actuators that move one or more heads that perform the adding or removing of material. In CNC machines that add material, heads can incorporate nozzles that spray or release polymers or other materials as in a conventional 3D printer. In some implementations, the heads can include an ink source such as a cartridge or pen. In the case of 3-D printing, material can be built up layer by layer until a fully realized 3D object has been created. In CNC machines that remove material, the heads can incorporate tools such as blades on a lathe, drag knives, plasma cutters, water jets, bits for a milling machine, a laser for a laser cutter, etc.

A laser cutter is a CNC machine that is configured to use a laser in a subtractive process to remove material from a workpiece. Although CNC machines have been used in industrial manufacturing settings for many years, the machines have recently been adapted for use by non-professionals by making them smaller, less expensive and easier to use. For example, some laser cutters may be sized for desktop use and may be enclosed in a low-profile housing that having a height of about 10 inches, a length of about 32 inches and a width of about 20 inches. Such desktop laser cutters can be used, for example, by students, hobbyists and/or small business owners.

Some conventional desktop laser cutters are used to remove material from a flat sheet of material by placing the flat sheet on a support surface within the laser cutter housing, and moving a cutting head relative to the sheet. Typically, the support surface has a horizontal orientation. The cutting head is moved within a plane that is parallel to the support surface and is defined by orthogonal X and Y axes. The cutting head directs an electromagnetic beam toward the sheet along a Z axis that is perpendicular to the X-Y plane, whereby material is removed from the sheet. As a result, the sheet may be engraved (removal of a partial thickness of material) or cut (removal of a full thickness of material).

It is desirable to adapt a desktop laser cutter to allow for material removal from non-flat workpieces, including cylindrical objects such as bottles and drinking glasses, while maintaining the relatively small and low profile form-factor of the desktop laser cutter and maximizing the size of the cylindrical workpiece that can be engraved.

SUMMARY

In some aspects, a desktop laser cutter that is configured to remove material from a workpiece, includes a laser that is configured to emit a beam of electromagnetic radiation, and a cutting head which receives the beam emitted from the laser, and emits a cutting beam. The laser cutter includes a gantry that supports the cutting head for movement along a first axis and a second axis that is perpendicular to the first axis, and an actuation system that is connected to the gantry and is configured to actuate elements of the gantry in such a way the cutting head is moved along at least one of the first axis and the second axis. In addition, the laser cutter includes a laser cutter housing having a base plate that is parallel to the first axis and the second axis, and a sidewall that surround the base plate. The laser, the cutting head, the gantry, and the actuation system are disposed in the laser cutter housing, and the cutting head is configured to emit the cutting beam in a direction parallel to the base plate.

In some embodiments, the gantry includes a fixed rail, the fixed rail extending linearly along the first axis; a support carriage that is mounted on the fixed rail and configured to translate along the fixed rail; and a movable rail that is supported on the support carriage so as to extend linearly along the second axis. The movable rail supports the cutting head in such a way that the cutting head can translate along the movable rail. The desktop laser cutter includes a fixture that is supported on the support carriage, and the fixture is configured to support the workpiece within the laser cutter housing.

In some embodiments, the fixture comprises a roller, the workpiece is in direct contact with the roller, and rotation of the roller results in rotation of the workpiece.

In some embodiments, the fixture is configured to support a cylindrical workpiece having a longitudinal axis, and when the cylindrical workpiece is supported by the fixture, the cylindrical workpiece is supported in such a way that the cylindrical workpiece can be rotated about the longitudinal axis.

In some embodiments, the fixture is configured to support a workpiece that is cylindrical relative to the cutting head in such a way that a) a longitudinal axis of the workpiece extends in a direction parallel to the base plate, and b) the workpiece is rotated about the longitudinal axis an amount that is a function of a displacement of the support carriage in a direction parallel to the first axis.

In some embodiments, the fixture includes a cradle that is configured to engage with the workpiece when the workpiece is supported on the fixture, and a bracket that connects the cradle to the support carriage, the cradle including a cradle arm that extends about a portion of a surface of the workpiece and is disposed between the workpiece and the base plate.

In some embodiments, the cradle includes a drive roller and an idler roller that are each supported for rotation on the cradle arm. In addition, the drive roller is mounted to the cradle arm at a location such that a) a portion of the drive roller protrudes beyond a cradle arm peripheral edge in a direction toward the base plate, and b) a contact surface of the drive roller is in direct contact with the base plate, whereby movement of the cradle arm relative to the base plate results in rotation of the drive roller.

In some embodiments, the cradle includes a driven roller, and the driven roller is mounted to the cradle arm at a location such that a) a portion of the driven roller protrudes beyond the cradle arm peripheral edge in a direction away from the base plate, and a contact surface of the driven roller is in direct contact with the workpiece when a workpiece is supported by the fixture, and b) the contact surface of the driven roller is in direct contact with the contact surface of the driver roller whereby rotation of the drive roller results in rotation of the driven roller.

In some embodiments, the idler roller is mounted to the cradle arm at a location such that a) the idler roller is spaced apart from the driven roller, and b) a portion of the idler roller protrudes beyond the cradle arm peripheral edge in a direction away from the base plate, and a contact surface of the idler roller is in direct contact with the workpiece when the workpiece is supported by the fixture.

In some embodiments, the fixture is configured to rotatably support the workpiece. The fixture includes a cradle, a drive roller that is rotatably mounted on the cradle and contacts the base plate, a driven roller that is rotatably mounted on the cradle, contacts the drive roller and is configured to contact the workpiece when the workpiece is supported on the fixture, and an idler roller that is rotatably mounted on the cradle at a location spaced apart from the driven roller. The idler roller is configured to contact the workpiece when the workpiece is supported on the fixture. The fixture is configured so that translation of the support carriage in a direction parallel to the first axis results in rotation of the drive wheel, rotation of the drive wheel results in rotation of the driven wheel, and rotation of the driven wheel results in rotation of the workpiece when the workpiece is supported on the fixture.

In some embodiments, the gantry includes a fixed optical device that is fixed relative to the laser and is configured to receive the beam emitted from the laser and redirect the beam. The gantry includes a fixed rail that extends linearly along the first axis and a support carriage that is mounted on the fixed rail and configured to translate along the fixed rail. The support carriage includes a first movable optical device that is movable relative to the laser, and is configured to receive the beam emitted from the fixed optical device and redirect the beam so that it travels in a direction that is parallel to the second axis and is received by a second movable optical device. The gantry includes a movable tail that is supported on the support carriage so as to extend linearly along the second axis, and the cutting head is supported on, and configured to translate relative to, the movable rail. The cutting head includes the second movable optical device, and the second movable optical device is configured to emit the cutting beam.

In some embodiments, the second movable optical device includes a first mirror and a second mirror. The first mirror receives the beam emitted from the first movable optical device and deflects the beam emitted from the first movable optical device to a direction perpendicular to the both the first axis and the second axis. The second mirror receives the beam from the first mirror and emits the cutting beam, and the second mirror is configured to emit the cutting beam in such a way that the cutting beam travels in a direction parallel to the first axis.

In some embodiments, the second movable optical device includes a lens that is configured to focus the cutting beam to a predetermined focal length.

In some embodiments, the cutting head includes a mounting body that is coupled to the movable rail in such a way that the mounting body is slideable along the movable rail. In addition, the cutting head includes an adjustment plate that supports at least a portion of the second movable optical device. The adjustment plate is supported on the mounting body in such a way that position of the adjustment plate relative to the mounting body can be adjusted along an axis that is parallel to a third axis, where the third axis is perpendicular to the first axis and the second axis.

In some embodiments, the movable rail includes a contoured portion having a shape configured to engage with a first coupling portion of the mounting body in such a way that the mounting body is retained on the movable rail and is slidable along the movable rail.

In some embodiments, the adjustment plate includes a slide portion, and the mounting body includes a coupling portion. The coupling portion includes a groove that receives the slide portion, and a lock that is configured to selectively engage the slide portion such that when the lock is engaged, the lock retains the slide portion in the groove, and when the lock is disengaged, the slide portion is movable relative to the groove.

In some aspects, a computer numerically controlled machine is configured to use a laser in a subtractive process to remove material from a cylindrical workpiece. The machine includes a housing, and the laser. The laser is disposed in the housing and configured to emit a beam of electromagnetic radiation. The machine includes a cutting head that is disposed in the housing and configured to receive the beam emitted from the laser and emit a cutting beam that performs the substractive process. In addition, the machine includes a gantry that is disposed in the housing. The gantry is configured to support the cutting head and move the cutting head within a plane defined by an x axis and a y axis, where the x axis is perpendicular to the x axis. The cutting head includes an optical device that directs the cutting beam so that it travels in a direction parallel to the plane.

In some embodiments, the machine includes a fixture that is supported on the gantry, and the fixture is configured to support the workpiece within the laser cutter housing in such a way that the workpiece is positioned in a path of the cutting beam and can rotated relative to the cutting head.

In some embodiments, the fixture comprises a roller, the workpiece is in direct contact with the roller, and rotation of the roller results in rotation of the workpiece.

In some embodiments, the fixture includes a cradle that is configured to engage with the workpiece when the workpiece is supported on the fixture, and a bracket that connects the cradle to the support carriage. The cradle includes a cradle am that extends about a portion of a surface of the workpiece and is disposed between the workpiece and the base plate.

In some embodiments, the cradle includes a drive roller and an idler roller that are each supported for rotation on the cradle arm, and the drive roller is mounted to the cradle arm at a location such that a) a portion of the drive roller protrudes beyond a cradle arm peripheral edge in a direction toward the base plate, and b) a contact surface of the drive roller is in direct contact with the base plate, whereby movement of the cradle arm relative to the base plate results in rotation of the drive roller.

In some embodiments, the fixture includes a cradle, a drive roller that is rotatably mounted on the cradle and contacts the housing, and a driven roller that is rotatably mounted on the cradle, contacts the drive roller and is configured to contact the workpiece when the workpiece is supported on the fixture. The fixture also includes an idler roller that is rotatably mounted on the cradle at a location spaced apart from the driven roller. The idler roller is configured to contact the workpiece when the workpiece is supported on the fixture. The fixture is configured so that translation of the support carriage in a direction parallel to the first axis results in rotation of the drive wheel, rotation of the drive wheel results in rotation of the driven wheel, and rotation of the driven wheel results in rotation of the workpiece when the workpiece is supported on the fixture.

In some embodiments, the optical device includes a first mirror that receives the beam emitted from the laser and deflects the beam emitted from the laser to a direction perpendicular to the plane, and a second mirror that receives the beam from the first mirror and emits the cutting beam. The first mirror is configured to emit the cutting beam in such a way that the cutting beam travels in a direction parallel to the plane and toward the workpiece.

In some embodiments, a position of the second mirror relative to the cutting head can be adjusted along a z axis, where the z axis is perpendicular to the x axis and the y axis.

In some embodiments, the gantry is configured to support the workpiece relative to the cutting head in such a way that a) a longitudinal axis of the workpiece extends in a direction parallel to the plane, and b) the workpiece is rotated about the longitudinal axis an amount that is a function of an amount of movement of the cutting head along the y axis.

In some embodiments, the gantry includes a fixed rail that is fixed relative to the laser and extends linearly along the y axis, and a support carriage that is mounted on the fixed rail and configured to translate along the fixed rail. The support carriage includes a second optical device that is disposed in the path of the beam emitted from the laser, and is configured to direct the beam to the first optical device. The gantry includes a movable rail that is supported on the support carriage so as to extend linearly along the x axis. The cutting head is mounted on the movable rail and is configured to translate along the movable rail. In addition, the workpiece is supported on the support carriage in such a way that a) a longitudinal axis of the workpiece extends in a direction parallel to the plane, and b) movement of the support carriage along the y axis causes a rotation of the workpiece about the longitudinal axis.

In some aspects, a laser cutter is configured for desktop use by being shaped and dimensioned for use while being supported on a desk or table. The laser cutter includes a laser cutter housing having a low profile, and length and width that have about the same dimensions as a small desktop. The laser cutter includes a device configured to emit electromagnetic energy in a beam form such as a laser. The laser is disposed in the laser cutter housing. The laser cutter includes a fixed optical device that is disposed in the housing, is fixed relative to the laser and is configured to receive the beam from the laser and redirect the beam. The laser cutter includes a fixed rail disposed in the housing. The fixed rail extends linearly along a Y axis that is disposed above, and parallel to, a base plate of the housing. The laser cutter includes a support carriage that is mounted on the fixed rail and configured to translate along the fixed rail. The support carriage includes a first movable optical device that is moveable relative to the laser, and is configured to receive the beam from the fixed optical device and redirect the beam so that it travels in a direction that is perpendicular to the Y axis. The laser cutter includes a movable rail that is supported on the support carriage so as to extend linearly along an X axis that is perpendicular to the Y axis and parallel to the base plate of the housing, and a cutting head that is mounted on the movable rail. The cutting head is also referred to as a cutting head, and is configured to translate along the movable rail. The cutting head includes a second movable optical device that is moveable relative to the laser and the first moveable optical device. The second moveable optical device is configured to receive the beam from the first moveable optical device and redirect the beam so that it travels along an axis parallel to the Y axis and the base plate of the housing. In particular, the beam emitted from the second moveable optical device is directed toward, and is applied to, the workpiece to be cut.

In some aspects, the laser cutter includes a fixture that is configured to permit laser engraving of a cylindrical workpiece within the housing of a desktop device. To this end, the cutting head includes optical components that redirect the beam emitted from a laser to a direction that is parallel to the X-Y plane and toward the workpiece. The horizontal cutting orientation described herein permits a cylindrical (non-flat) workpiece to be received within the laser cutter housing with the cutting head of the laser cutter disposed side-by-side with the workpiece rather than above it. By configuring the cutting head to direct the beam in a direction parallel to the X-Y plane, the height of a non-flat workpiece is not limited by a distance between the cutting head and the support surface of the laser cutter housing. In other words, the height of the non-flat workpiece is not limited by a dimension of the laser cutter housing in in the Z axis direction. This can be compared to some conventional laser cutters having a cutting head that emits a beam in the Z direction, whereby the height of the non-flat workpiece may be limited by a distance between the cutting head and the support surface of the laser cutter housing, or in which the support surface and the base of the laser cutter housing may need to be removed and replaced with a lower floor in order to accommodate the height of a non-flat workpiece.

In some aspects, the laser cutter includes a fixture that supports the cylindrical workpiece relative to the cutting head and rotates the workpiece about its longitudinal axis to facilitate correct placement of the beam on the workpiece surface to obtain the desired engraving pattern. More particularly, the longitudinal axis is oriented parallel to the X axis, and the fixture moves in concert with movement of the cutting head along a Y axis. Movement of the fixture along the Y axis results in a corresponding rotation of the workpiece about its longitudinal axis. The rotation of the workpiece about its longitudinal axis, when performed in combination with movement of the cutting head along the X axis, allows correct placement of the beam on the workpiece surface to obtain the desired cut pattern.

DETAILED DESCRIPTION

Figure 1:
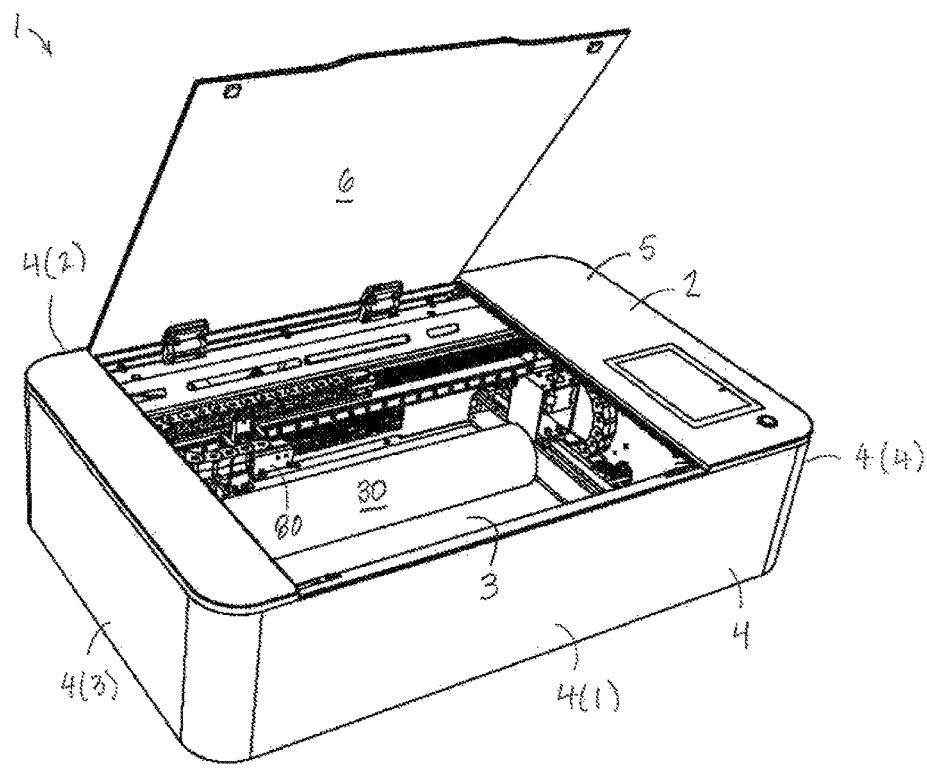
FIG. 1 is a perspective view of a desktop laser cutter.

Referring to FIGS. 1-7, a CNC machine in the form of a desktop laser cutter 1 includes a laser 20 that is configured to emit a beam 23 of electromagnetic radiation, a cutting head 80 that is supported for movement within an X-Y plane by a gantry 60, and a system of optical devices 40 that are configured to receive the beam 23 emitted from the laser 20 and redirect it toward a workpiece 30. The laser cutter 1 includes other ancillary devices and systems including an actuation system 70 that cooperates with the gantry 60 to move the cutting head 80, and a control system (not shown) that controls the laser 20, the actuation system 70, a laser cooling system (not shown) and an air system (not shown). The air system controls byproducts of the laser's interaction with the workpiece 30 such as smoke, which may in turn damage portions of the machine, for example by fouling optical devices. In addition, the air system exhausts air which may contain undesirable byproducts from the laser cutter 1. The laser 20, the cutting head 80, the optical devices 40, the workpiece 30 and the other ancillary devices and systems are enclosed in a laser cutter housing 2. The laser cutter 1 also includes features that permit cutting of a workpiece 30 that is thick relative to sheet stock or has a contoured shape, including workpieces having a height dimension that is greater than a distance of the cutting head 80 from a base plate 3 of the laser cutter housing 2. In the illustrated embodiment, for example, the workpiece 30 is cylindrical. The laser cutter features that permit cutting of the cylindrical workpiece 30 include providing the cutting head 80 that is configured to apply the beam 23 to a lateral side of the workpiece 30 rather than to an upward-facing surface of the workpiece 30, as discussed in detail below. In addition, the laser cutter features that permit cutting of the cylindrical workpiece 30 include a fixture 100 that is supported on the gantry 60 and is configured to support a cylindrical workpiece 30 within the laser cutter housing 2 at a location appropriate for cutting by the cutting head 80. The fixture 100 is configured to rotate the cylindrical workpiece about its longitudinal axis 34 to facilitate correct placement of the beam 23 on the workpiece surface relative to the cutting head 80 to obtain the desired cut pattern, as discussed in detail below.

As used herein, the terms "cut," "cutting" or variations thereof generally refer to altering the appearance, properties, and/or state of a material. Cutting can include, for example, making a through-cut, engraving, bleaching, curing, burning, etc. Engraving, when specifically referred to herein, indicates a process by which a CNC machine modifies the appearance of the material without fully penetrating it. For example, in the context of a laser cutter, it can mean removing some of the material from the surface, or discoloring the material, e.g., through an application of focused electromagnetic radiation delivering electromagnetic energy as described below.

As used herein, the terms "laser," "laser beam" or "beam" include any electromagnetic radiation or focused or coherent energy source that (in the context of being a cutting tool) uses photons to modify a substrate or cause some change or alteration upon a material impacted by the photons. The laser 20 that emits the beam is configured to generate the electromagnetic radiation for use by the laser cutter 1 and can be of any desired wavelength, including for example, microwave, lasers, infrared lasers, visible lasers, UV lasers, X-ray lasers, gamma-ray lasers, or the like. In the illustrated embodiment, the laser 20 is a carbon dioxide (CO2) laser configured to generate a beam 23 of approximately 40 watts from a laser tube 21. The laser 20 is not limited to this configuration, and in other embodiments the laser 20 may be used to generate beams having other powers. The term "cutting beam" refers to a portion of the beam that is emitted from the cutting head 80, intersects a surface of the workpiece 30 and performs a cutting operation.

As used herein, the term "workpiece" refers to the material that is placed in the laser cutter housing 2 to be cut. This may include, for example, the raw materials, stock, or the like. In some embodiments, the workpiece may be a flat (e.g., relatively thin and generally planar) sheet of material. In the illustrated embodiment, the workpiece 30 is cylindrical, and may be a bottle, glass, tube or other cylindrical structure. The workpiece 30 includes a first end 31, an opposed second end 32, and a longitudinal axis 34 that extends through both ends 31, 32 and is collinear with a centerline (e.g., line of rotational symmetry) of the workpiece 30. One end or both ends 31, 32 of the workpiece 30 may be closed, or both ends 31, 32 of the workpiece 30 may be open. The workpiece 30 may have a uniform diameter. Alternatively, the workpiece 30 may have a non-uniform diameter. In this case, the workpiece 30 may be tapered or include a tapered, curved and or necked portion, for example as may be the case when the workpiece 30 is a bottle.

The laser cutter housing 2 includes a base plate 3, a sidewall 4 that surrounds the base plate 3 and a top 5 that includes a hinged door 6 that opens to allow access to the interior of the laser cutter housing 2. For example, the workpiece 30 is inserted into the laser cutter housing via the door 6. The sidewall 4 includes a front side 4(1), a rear side 4(2) and lateral sides 4(3), 4(4) that extend between the front side 4(1) and the rear side 4(2). The laser cutter housing 2 prevents egress of electromagnetic radiation from the laser cutter housing 2 during a cutting operation of the laser 20. The laser cutter housing 2 has a rectangular shape that is dimensioned to be supported on top of a desk or table and has profile that is sufficiently low to allow a user to insert or remove a workpiece 30 from the laser cutter housing 2 via the door 6 in the top of the laser cutter housing 2.

Figure 2:
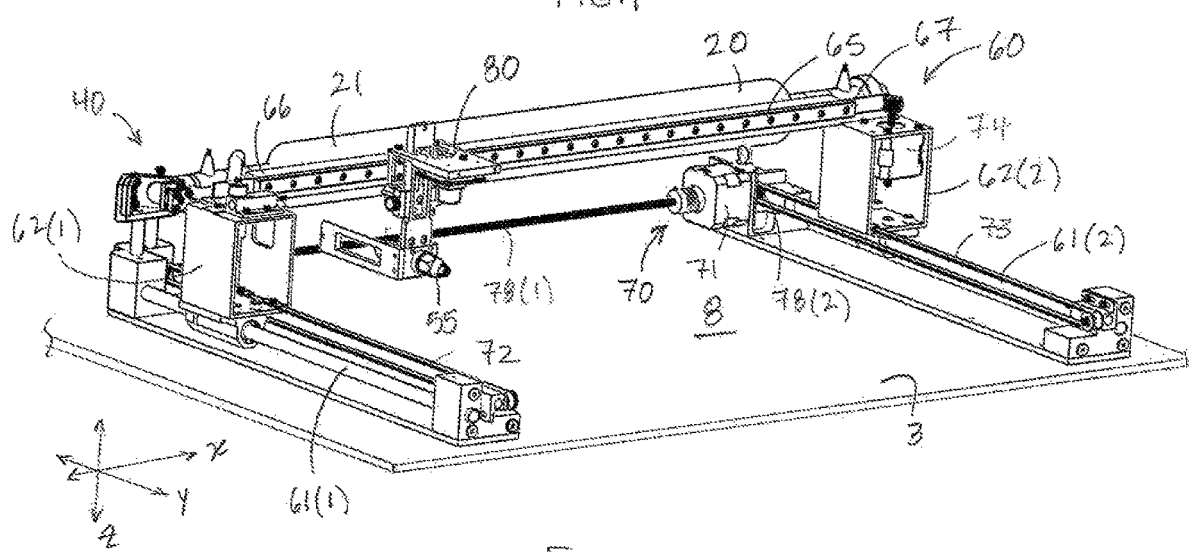
FIG. 2 is a front perspective view of the desktop laser cutter of FIG. 1 showing the laser, the cutting head, the gantry, the actuation system and the system of optical devices, and with the laser cutter housing, the fixture and some other ancillary devices and systems omitted.
Figure 3:
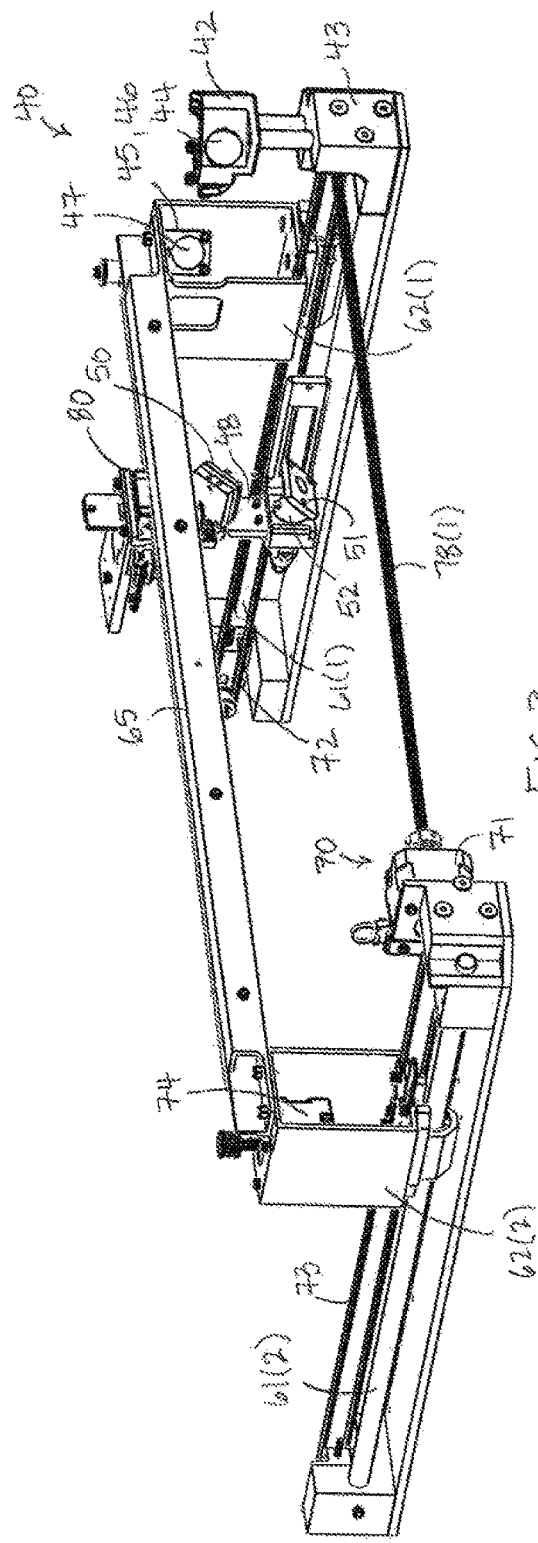
FIG. 3 is a rear perspective view of the desktop laser cutter of FIG. 1 showing the cutting head, the gantry, the actuation system and the system of optical devices, and with the laser, the laser cutter housing, the fixture and some other ancillary devices and systems omitted.

As used herein, references to relative direction such as above, below, front, rear, lateral, overlying, underlying, underside, etc., are made with reference to the orientation of the laser cutter 1 illustrated in the figures. The references to relative direction are used herein to simplify understanding of the disclosed assemblies and systems, and are not intended to be limiting. Although it is contemplated that the laser cutter 1 will likely be operated in the orientation shown in the figures, the laser cutter 1 is not limited to the orientation shown in the figures. In addition, references are made to a reference system that includes X, Y and Z axes that are mutually orthogonal, and that are oriented with respect to the laser cutter 1 as shown in FIG. 2. In this regard, a reference to an X-Y plane refers to a plane that is parallel to both the X and Y axes, an X-Z plane refers to a plane that is parallel to both the X and Z axes, and a Y-Z plane refers to a plane that is parallel to both the Y and Z axes. For example, the base plate 3 of the laser cutter housing 2 is resides in an X-Y plane.

The laser 20 is disposed inside the laser cutter housing 2 so as to extend in parallel to the base plate 3 along the rear side 4(2). Although in the illustrated embodiment, the laser 20 is supported on the rear side 4(2) of the laser cutter housing 2, for example via brackets (not shown), the laser 20 may alternatively be supported on the base plate 3, for example via stanchions (not shown).

The gantry 60 is disposed in the laser cutter housing 2 between the laser 20 and the front side 4(1). The gantry is supported on the base plate 3. More specifically, the gantry 60 includes a pair of fixed rails 61(1), 61(2) that are fixed to the base plate 3 and extend in a direction that is parallel to the Y axis. The pair of fixed rails includes a first fixed rail

61(1) and a second fixed rail 61(2). Each fixed rail 61(1), 61(2) extends linearly between the front and rear of the laser cutter housing 2. Each fixed rail 61(1), 61(2) overlies, and is spaced apart from, the base plate 3. In addition, the fixed rails 61(1), 61(2) are spaced apart from each other, and the space between the fixed rails 61(1), 61(2) defines a work area 8 in which the workpiece 30 is received. Each fixed rail 61(1), 61(2) supports a support carriage 62(1), 62(2). Each support carriage 62(1), 62(2) is mounted on a corresponding fixed rail 61(1), 61(2) so as to be able to translate freely along the fixed rail 61(1), 61(2). In the illustrated embodiment, the first and second support carriages 62(1), 62(2) are mounted on a corresponding fixed rail 61(1), 61(2) via linear bearings.

The gantry 60 includes a movable rail 65 that includes a movable rail first end 66, and a movable rail second end 67 that is opposed the movable rail first end 66. The movable rail first end 66 is supported on a first one 62(1) of the support carriages 62(1), 62(2), and the movable rail second end 67 is supported on a second one 62(2) of the support carriages 62(1), 62(2) so as to overlie, and be spaced apart from, the base plate 3. By this configuration, the movable rail 65 extends linearly between the lateral sides 4(3), 4(4) of the laser cutter housing 2, and in parallel to the X axis. In addition, since the movable rail 65 is supported on the support carriages 62(1), 62(2), the movable rail 65 is movable in an X-Y plane between the front and rear of the laser cutter housing 2 by corresponding movement of the support carriages 62(1), 62(2).

The movable rail 65 supports a third carriage that is referred to as the cutting head 80. The cutting head 80 is mounted on the movable rail 65 so as to translate along the movable rail 65. In other words, the cutting head 80 is moveable along an axis that is parallel to the X axis independently of the position of the movable rail 65 along an axis that is parallel to the Y axis. The cutting head 80 is moved along the movable rail 65 via the actuation system 70, as will now be discussed in detail.

The support carriages 62(1), 62(2) are moved in conceit with each other along the corresponding fixed rail 61(1), 61(2) via the actuation system 70. For example, in the illustrated embodiment, the actuation system 70 is a belt-drive system. The actuation system 70 includes a reversible first motor 71 that is supported on the base plate 3. The first motor 71 is a dual shaft motor. A first output shaft 78(1) of the first motor 71 drives a first endless belt 72, and a second output shaft 78(2) of the first motor 71 drives a second endless belt 73. The first support carriage 62(1) is fixed to the first endless belt 72, and the second support carriage 62(2) is fixed to the second endless belt 73. The first endless belt 72 is disposed adjacent to the first fixed rail 61(1) and extends in parallel with the first fixed rail 61(1), while the second endless belt 73 is disposed adjacent to the second fixed rail 61(2) and extends in parallel to the second fixed rail 61(2). When the first motor 71 is actuated, the first and second endless belts 72, 73 are driven in concert, which in turn causes the first support carriage 62(1) and the second support carriage 62(2) to slide, in concert, along the respective first and second fixed rails 61(1), 61(2) in a direction parallel to the Y axis.

Figure 7:
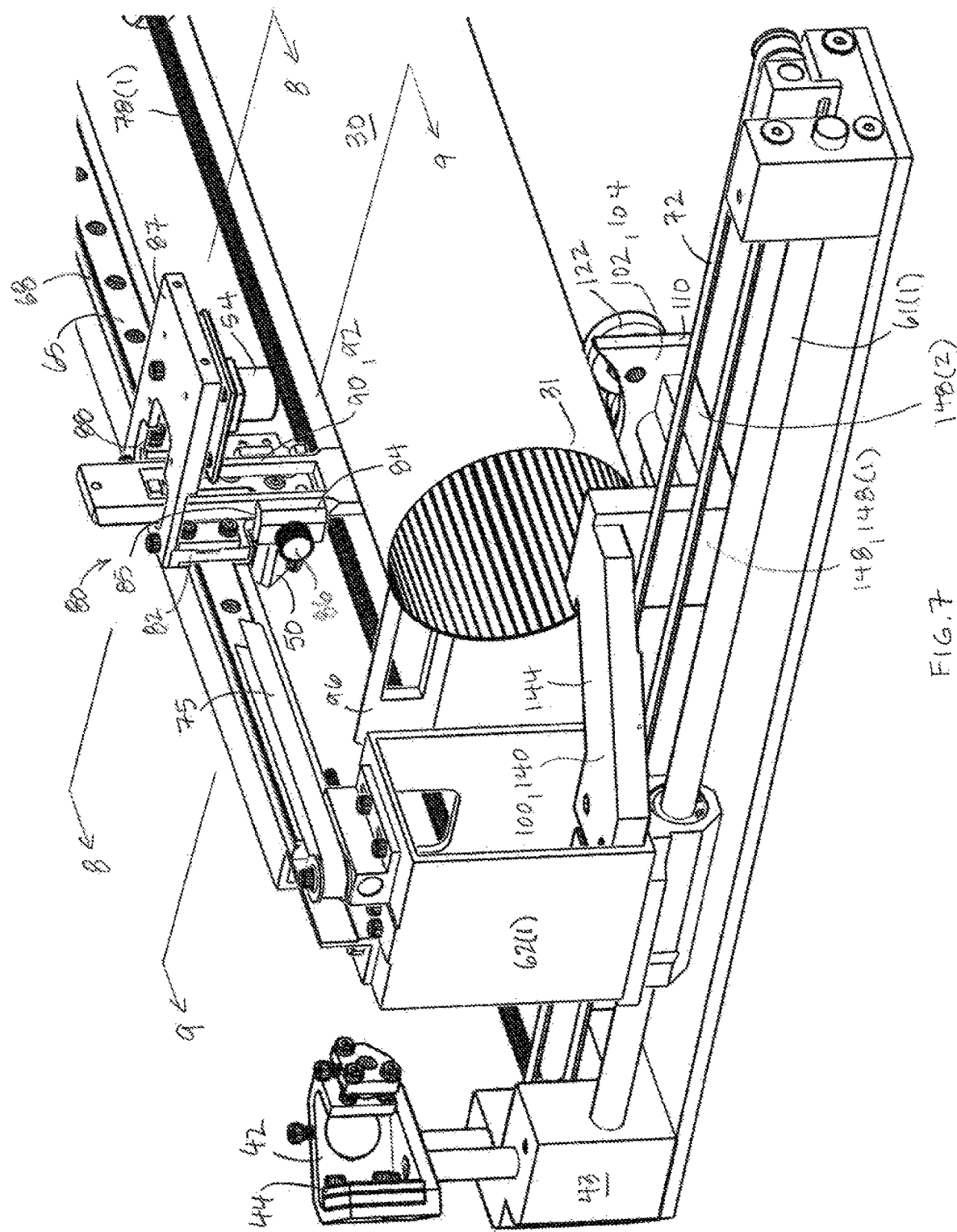
FIG. 7 is an enlarged view of a portion of FIG. 2 showing the fixture and with the cylindrical workpiece disposed in the work area.

The actuation system 70 includes a reversible second motor 74 that is supported on the second support carriage 62(2). The second motor 74 drives a third endless belt 75. The third endless belt is omitted from all figures except FIG. 7 to permit visualization of the gantry 60 and cutting head 80. In FIG. 7, a portion of the third endless belt 75 is cut away to permit visualization of the cutting head 80. The cutting head 80 is fixed to the third endless belt 75, which is disposed adjacent to the movable rail 65 and extends in parallel to the movable rail 65. When the second motor 74 is actuated, the third endless belt 75 is driven, which in turn causes the cutting head 80 to slide along the movable rail 65 in a direction parallel to the X axis. By this configuration, the cutting head 80 is moveable along an axis that is parallel to the X axis independently of the position of the movable rail 65 along an axis that is parallel to the Y axis.

The first and second motors 71, 74 and the laser 20 are controlled by the control system in such a way that the cutting head 80 can be moved in any pattern relative to the workpiece 30 to carry out a cutting operation. The pattern may be implemented via a set of computer implemented instructions carried out by a controller (not shown) of the control system. Computer-executable instructions may include instructions and data which cause a general purpose computer, special purpose computer, or special purpose processing device to perform a certain function or group of functions. Computer-executable instructions may also include program modules that are executed by computers in stand-alone or network environments. Program modules may include routines, programs, objects, components, or data structures that perform particular tasks or implement particular abstract data types.

The laser 20 is oriented within the laser cutter housing 2 so as to emit a beam 23 in a direction parallel to the X axis. The system of optical devices 40 is configured to receive the beam 23 from the laser, and direct the beam 23 within the laser cutter housing 2 so that it is emitted from the cutting head 80 and applied to the workpiece 30. The system of optical devices 40 includes a fixed optical device 42, a first movable optical device 45, a second movable optical device 48, and a lens 52.

Figure 4:
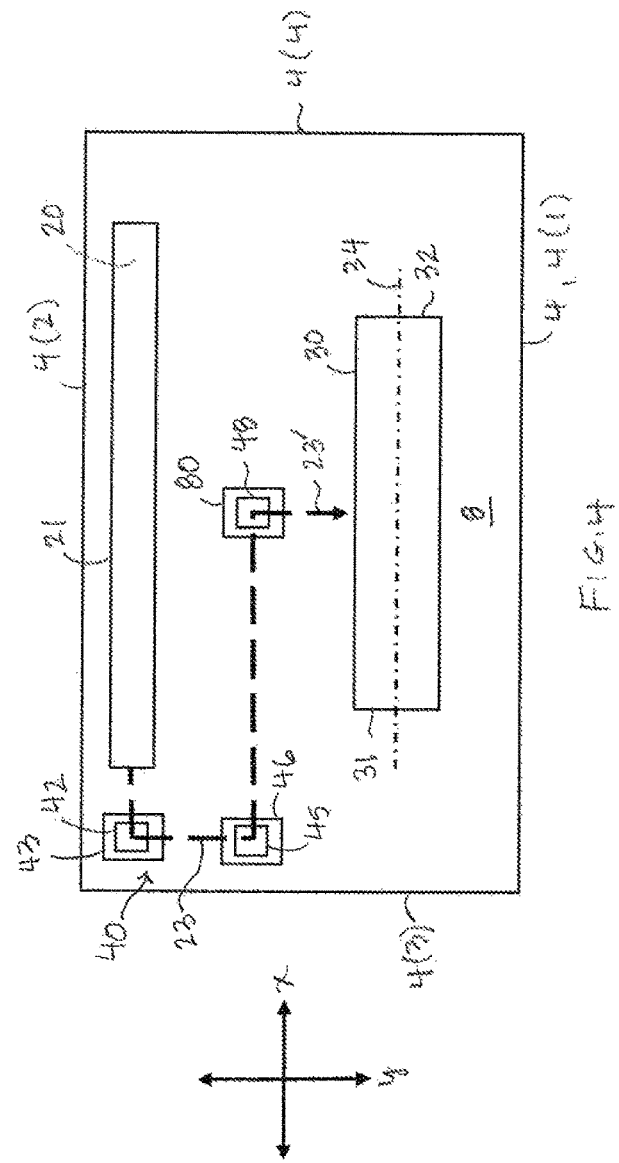
FIG. 4 is a schematic top view of the desktop laser cutter of FIG. 1 showing the beam path through the optical system as seen when viewing the X-Y plane.
Figure 5:
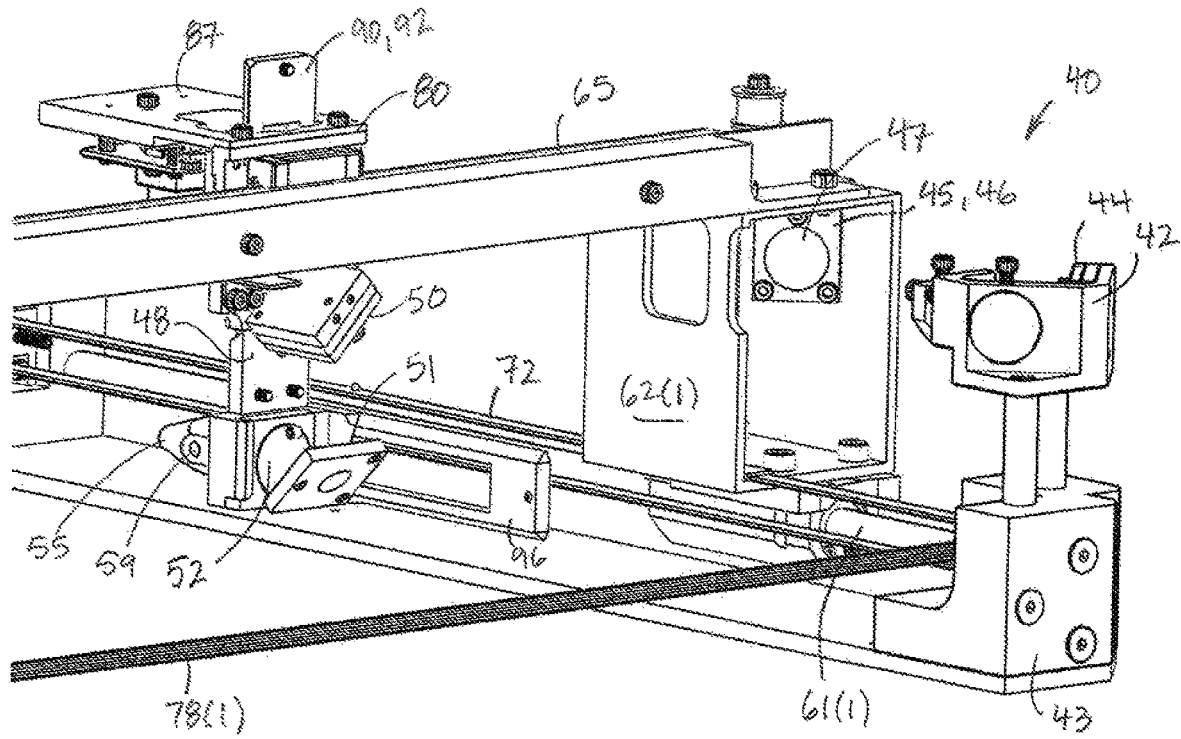
FIG. 5 is an enlarged view of a portion of FIG. 3.
Figure 6:
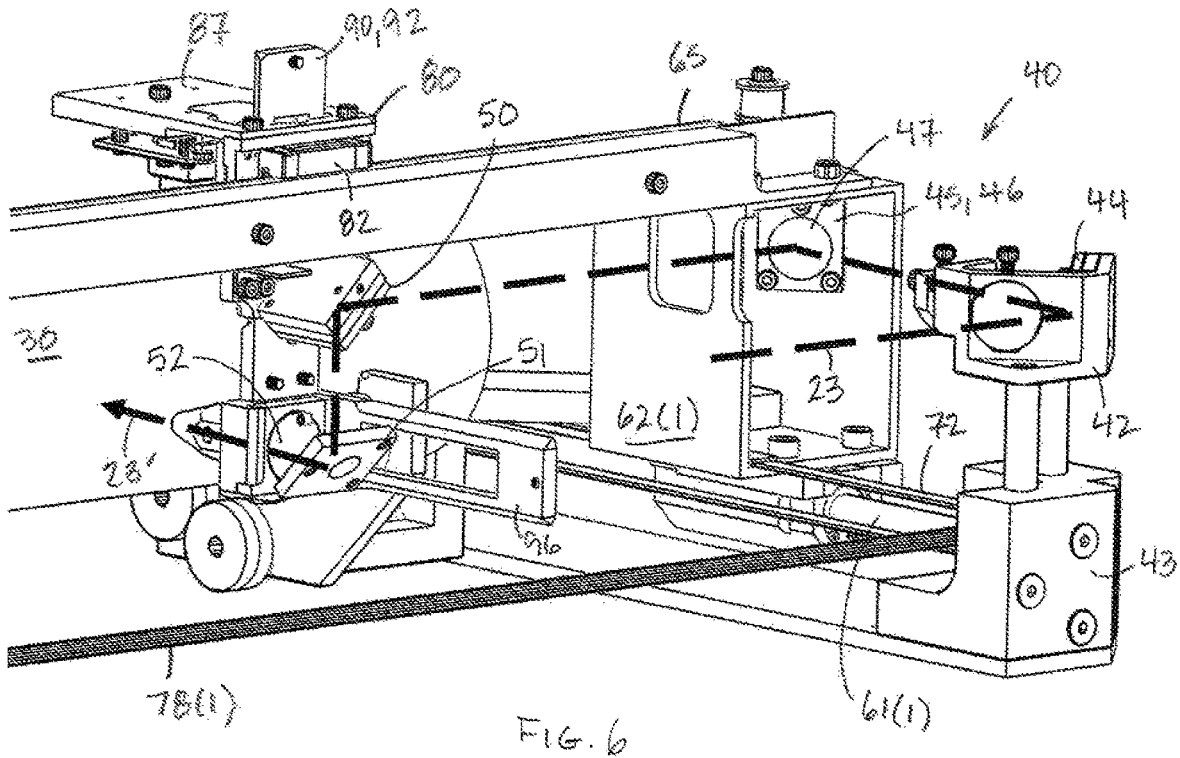
FIG. 6 is an enlarged view of a portion of FIG. 3 showing the fixture and beam path, and with the cylindrical workpiece disposed in the work area.

Referring to FIGS. 4 and 6, the fixed optical device 42 receives the beam 23 directly from the laser 20 and directs it along an axis that is parallel to the Y axis toward the first support carriage 62(1). The fixed optical device 42 includes a first mount 43 that is fixed to the base plate 3 and a first mirror 44 that is supported on the first mount 43. The first mirror 44 is oriented so as to intercept the beam 23 emitted from the laser 20 and change its direction by 90 degrees, redirecting it to extend in a direction parallel to the Y axis and toward the front side 4(1) of the laser cutter housing 2. The first support carriage 62(1), including the first movable optical device 45, is disposed in the path of the beam 23 so as to reside between the fixed optical device 42 and the front side 4(1) of the laser cutter housing 2.

The first movable optical device 45 receives the beam 23 emitted from the fixed optical device 42 and directs it along an axis that is parallel to the X axis toward the second movable optical device 48. The first movable optical device 45 includes a second mount 46 that is fixed to the first support carriage 62(1), and a second mirror 47 that is supported on the second mount 46. The second mirror 47 is oriented so as to intercept the beam 23 emitted from fixed optical device 42 and change its direction by 90 degrees, redirecting it to extend in a direction parallel to the X axis and toward a lateral side 4(4) of the laser cutter housing 2. The cutting head 80, including the second movable optical device 48, is disposed in the path of the beam 23 so as to reside between the first movable optical device 45 and the lateral side 4(4) of the laser cutter housing 2.

The second movable optical device 48 receives the beam 23 emitted from the first movable optical device 45 and directs it along an axis that is parallel to the Y axis toward the work area 8 which receives the workpiece 30. The second movable optical device 48 includes third and fourth mirrors 50, 51 and a lens 52 that focuses the beam 23.

The third mirror 50 is oriented so as to intercept the beam 23 emitted from first movable optical device 45 and change its direction by 90 degrees, redirecting it to extend in a direction parallel to the Z axis and toward the base plate 3 of the laser cutter housing 2.

The fourth mirror 51 is disposed in the path of the beam 23 so as to reside between the third mirror 50 and the base plate 3, and is oriented so as to intercept the beam 23 emitted from third mirror 50 and change its direction by 90 degrees. The fourth mirror 51 redirects the beam 23 to extend in a direction parallel to the Y axis and toward the work area 8 and the front side 4(1) of the laser cutter housing 2.

The lens 52 is disposed in the path of the beam 23 emitted from the fourth mirror 51 so as to reside between the fourth mirror 51 and the front side 4(1) of the laser cutter housing. More particularly, the lens 52 is disposed in the path of the beam 23 emitted from the fourth mirror 51 so as to reside between the fourth mirror 51 and the workpiece 30. The lens 52 focuses the beam 23, and the focused beam 23 is applied to a portion of the surface of the workpiece 30 that faces the rear side 4(2) of the laser cutter housing 2. In the illustrated embodiment, the controller maintains the second movable optical device 48 at a predetermined distance from the workpiece 30, where the predetermined distance corresponds to a focal length of the lens 52.

The second movable optical device 48 is supported on the cutting head 80, and thus moves with the cutting head 80 along an axis that is parallel to the X axis. The cutting head 80 also supports a camera 54 and a nozzle 55, as discussed further below.

Figure 8:
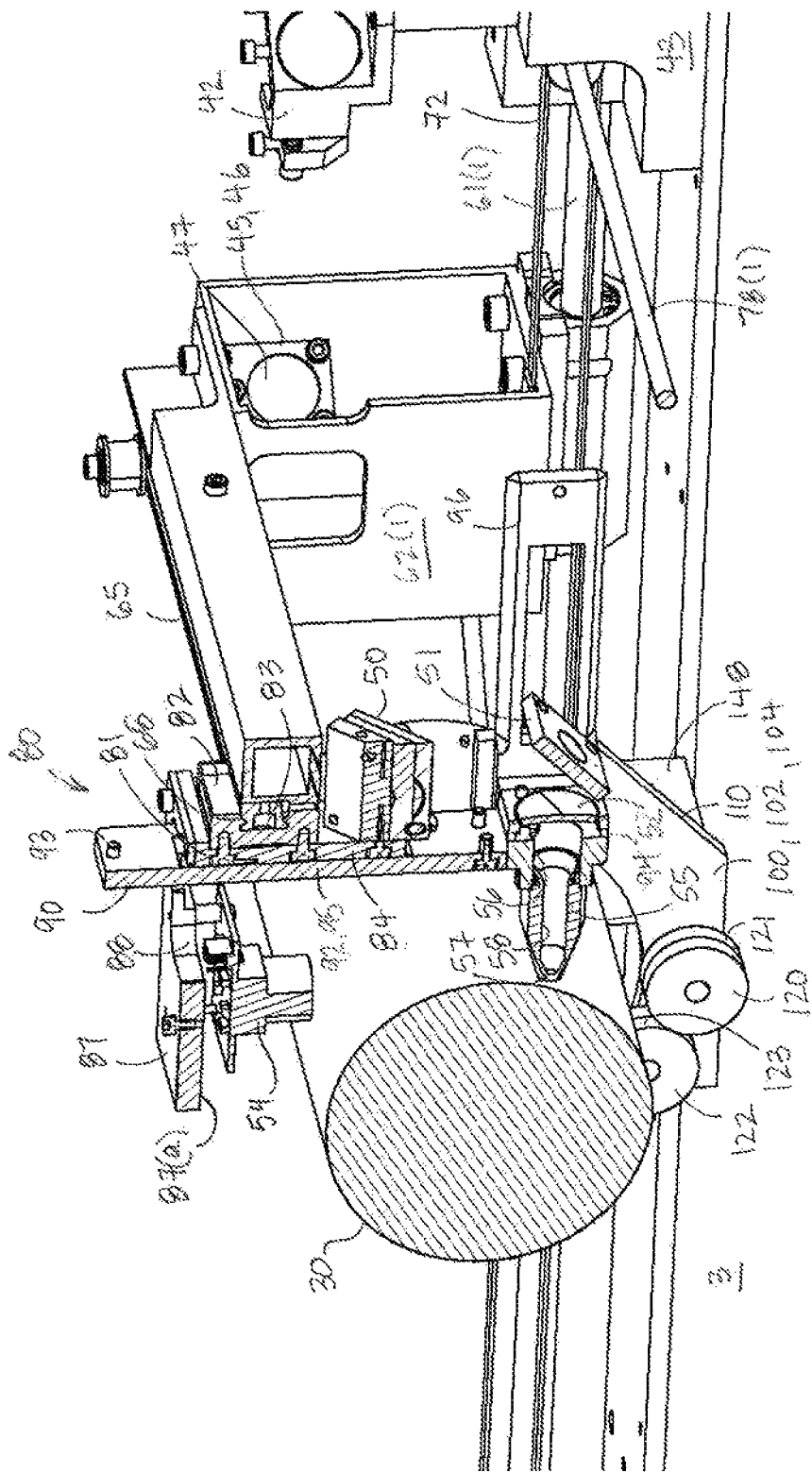
FIG. 8 is a perspective cross sectional view of the desktop laser cutter as seen along line 8-8 of FIG. 7.

Referring to FIGS. 7 and 8, the cutting head 80 includes a mounting body 81 that is secured to the movable rail 65 in such a way that the mounting body 81 slides freely along the movable rail 65, and an adjustment plate 90 that is secured to the mounting body 81 in such a way that position of the adjustment plate 90 relative to the mounting body 81 can be adjusted.

The mounting body 81 includes a first support arm 87. The first support arm 87 is a plate that resides in an X-Y plane and protrudes from the mounting body 81 toward the front side 4(1) of the laser cutter housing 2. The first support arm 87 supports the camera 54. The camera 54 is mounted to an underside 87(a) of the first support arm 87 so as to face the base plate 3, and is configured to obtain images of a workpiece disposed on, or overlying, the base plate 3 and provide the images to the control system. In some embodiments, the information obtained from the camera is used by the controller to optimize placement of the pattern on the workpiece 30, for example to achieve requirements such as minimizing material waste, maximizing pattern size, etc. The first support arm 87 protrudes from the mounting body 81 at a location above the movable rail 65 so that the camera 54 and the movable rail 65 are generally coplanar in an X-Y plane. The first support arm 87 includes a through opening 88 that receives the adjustment plate 90 therethrough in a clearance fit.

The mounting body 81 includes a first coupling portion 82 that is engaged with, and slidably receives, a contoured portion 68 of the movable rail 65. The first coupling portion 82 includes a first groove 83 that faces the rear side 4(2) of the laser cutter housing 2. The first groove 83 has a contour that is complimentary to the contoured portion 68 of the movable rail 65. As a result, the first groove 83 engages the contoured portion 68 in such a way that the mounting body 81 can slide along the movable rail 65 in a direction parallel to the X axis while being retained on the movable rail 65.

The mounting body 81 includes a second coupling portion 84 that receives a slide portion 92 of the adjustment plate 90. The second coupling portion 84 includes a second groove 85 which receives the slide portion 92, and a locking screw 86 that passes through the second coupling portion 84 and selectively engages the slide portion 92. The second groove 85 faces the front side 4(1) of the laser cutter housing 2. When the locking screw 86 is not engaged with the slide portion 92, the slide portion 92 slides freely within the second groove 85 in a direction parallel to the Z axis. When the locking screw 86 engaged with the slide portion 92, the position of the adjustment plate 90 relative to the mounting body 81 is fixed. By this configuration, the position of the adjustment plate 90 relative to the mounting body 81 can be adjusted in a direction parallel to the Z axis, and then secured in the desired position via the locking screw 86. In the illustrated embodiment, for example, the locking screw 86 is a thumb screw that can easily be tightened or loosened by hand.

The third mirror 50 is supported on the surface of the mounting body 81 that faces the rear side 4(2) of the laser cutter housing 2. More specifically, the third mirror 50 is fixed to mounting body 81 at a location that underlies the first coupling portion 82.

The adjustment plate 90 includes the slide portion 92 that is received in the second groove 85, and a second support arm 96 that protrudes toward a rear side 4(2) of the laser cutter housing 2 relative to the mounting body 81.

The slide portion 92 is elongated, and includes a first end 93 that is received in the through opening 88 of the first support arm 87, a second end 94 that is opposed to the first end 93, and a mid region 95 that is disposed between the first end 93 and the second end 94. The slide portion mid region 95 is received within the second groove 85, and the slide portion second end 94 supports a nozzle 55 and a second support arm 96. The nozzle 55 is disposed on a surface of the slide portion 92 that faces the front side 4(1) of the laser cutter housing 2. The nozzle 55 is aligned with a beam receiving opening in the slide portion second end 94. The nozzle 55 is a hollow, tapered tube that is open at opposed ends 56, 57. An inner surface of the nozzle 55 defines a through passage 58 that is aligned with the focused beam 23 emitted from the lens 52. The nozzle 55 is a part of the air system, and includes an air inlet 59 (FIG. 5) disposed between the opposed ends 56, 57 of the nozzle 55. The air inlet 59 receives a stream of pressurized air, which is directed by the nozzle 55 toward the workpiece 30. The pressurized air stream disperses smoke and other byproducts of the laser's interaction with the workpiece 30 during a cutting operation. In some applications in which a cylindrical workpiece 30 is being cut, the position of the slide portion 92 may be adjusted along the Z axis so that the lens 52 and nozzle 55 are aligned with a diameter of the workpiece 30 that is parallel to the Y axis.

The second support arm 96 is a plate that resides in a Y-Z plane and protrudes from the slide portion 92 toward a rear side 4(2) of the laser cutter housing 2. The second support arm 96 supports the beam-focusing lens 52 and the fourth mirror 51. The position of the fourth mirror 51 on the second support arm 96 is adjusted so that it underlies the third mirror 50 (e.g., is aligned along the Z axis). The lens 52 is oriented so as to reside in an X-Z plane, and is aligned with the beam receiving opening in the slide portion second end 94. The position of the second support arm 96 is adjustable relative to the slide portion 92 along an axis that is parallel to the Y axis to maintain a focal length of the lens 52 relative to the workpiece 30.

Referring to FIGS. 4 and 6, in use, the laser 20 emits the beam 23, which is directed by the first mirror 44 on the fixed optical device toward the second mirror 47 of the first movable optical device 45. The beam 23 is then directed by the second mirror 47 toward the third mirror 50 on the second movable optical device 48. As the beam 23 is directed from the laser 20 to the third mirror 50, the beam 23 travels in an X-Y plane. The third mirror 50 directs the beam 23 along an axis that is parallel to the Z axis to the fourth mirror 51, and the fourth mirror 51 directs the beam 23 along an axis that is parallel to the Y axis toward the workpiece 30. As a result, the beam 23 is applied to a side of the workpiece 30 that faces the rear side 4(2) of the laser cutter housing 2. In addition, the orientation of the beam 23 as it is applied to the workpiece 30 permits a cylindrical (non-flat) workpiece to be received within the laser cutter housing 2, with the cutting head 80 disposed side-by-side with the workpiece 30.

Since the position of the adjustment plate 90 relative to the mounting body 81 can be adjusted in a direction parallel to the Z axis by positioning the slide portion 92 within the second groove 85, the position of the fourth mirror 51, the lens 52, and nozzle 55 are also adjustable in a direction parallel to the Z axis. In other words, the distance of the fourth mirror 51, the lens 52, and nozzle 55 from the base plate 3 can be adjusted, allowing the position of the cutting beam 23' to be optimally positioned with respect to a height of a workpiece. For example, for a cylindrical workpiece that is oriented in the laser cutter 1 with the longitudinal axis 34 of the workpiece oriented in parallel with the X axis, it may be desirable to position the cutting beam 23', which extends in a direction parallel to the Y axis, so that it is aligned with the longitudinal axis 34 (centerline) of the workpiece 30.

Figure 9:
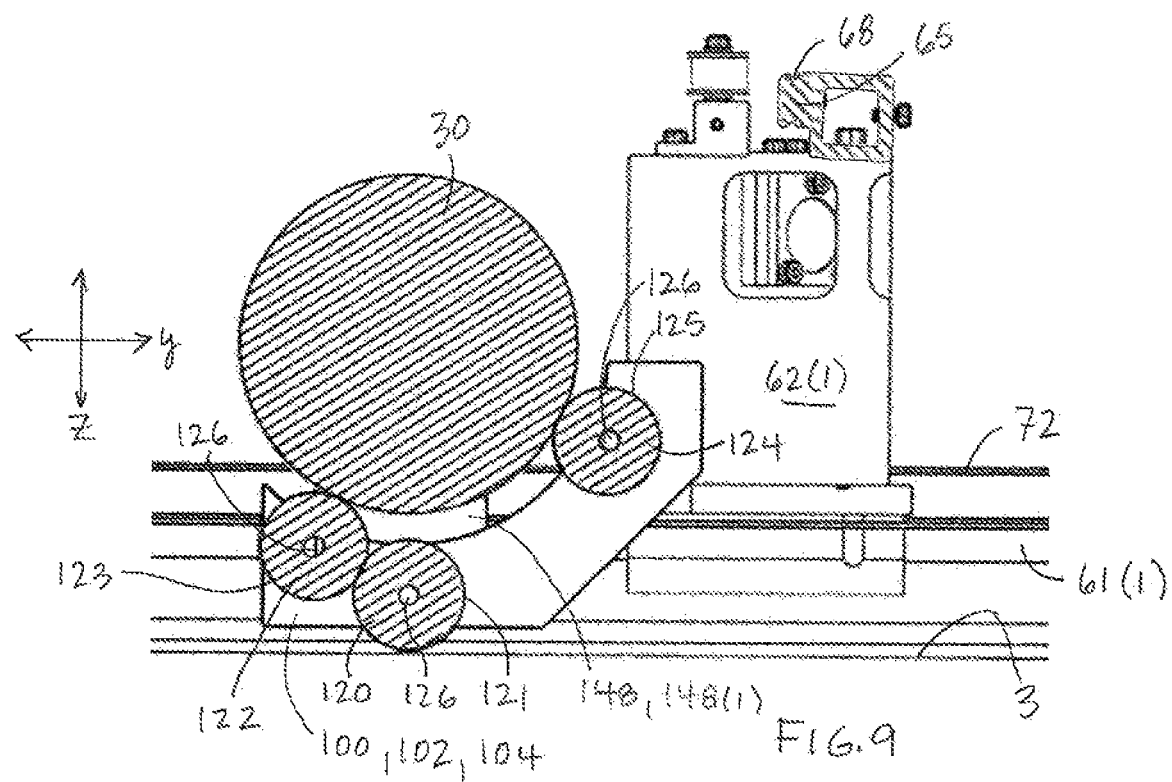
FIG. 9 is a side cross sectional view of the fixture as seen along line 9-9 of FIG. 7.

Referring to FIGS. 7-9, the first support carriage 62(1) includes the fixture 100. The fixture 100 supports the workpiece 30 within the laser cutter housing 2 in such a way that the longitudinal axis 34 of the workpiece 30 is oriented parallel to the X axis, and the workpiece 30 overlies, and is spaced apart from, the base plate 3. In addition, the fixture 100 supports the workpiece 30 in such a way that the workpiece 30 can be selectively rotated about the longitudinal axis 34, as discussed further below. The fixture 100 includes a cradle 102 that supports the workpiece 30 in the above-described configuration, and a bracket 140 that connects the cradle 102 to the first support carriage 62(1).

The bracket 140 includes an angled portion 144 that resides in an X-Y plane and protrudes outward from the first support carriage 62(1) in a direction that is both toward the front side 4(1) of the laser cutter housing 2 and toward the second fixed rail 61(2). The bracket 140 includes a connecting portion 148 that extends from the angled portion 144. The connecting portion 148 is L shaped. One leg of the L provides a depending portion 148(1) of the connecting portion 148, and the other leg of the L provides an extension portion 148(2) of the connecting portion 148. The depending portion 148(1) connects the angled portion 144 to the extension portion 148(2). The depending portion 148(1) extends a direction parallel to the Z axis, whereby the extension portion 148(2) is disposed at a location overlying and adjacent to the base plate 3. In addition, the extension portion 148(2) resides in an X-Y plane and protrudes in a direction parallel to the X axis, whereby the extension portion 148(2) is disposed between the base plate 3 and the workpiece 30. The extension portion 148(2) is connected to the cradle 102.

The cradle 102 includes a cradle arm 104, which is a thin, rigid plate having a peripheral edge 110 that is irregularly shaped such that the cradle arm has 104 generally curved profile when viewed in a direction parallel to the X axis. The cradle arm 104 resides in a Y-Z plane, extends between the workpiece 30 and the base plate 3, and surrounds a portion of a circumference of the workpiece 30. The cradle 102 also includes a drive roller 120, a driven roller 122 and an idler roller 124, which are supported for rotation on the cradle arm 104 via pins 126. Each pin 126 is oriented in a direction parallel to the X axis. In the illustrated embodiment, the drive roller 120, the driven roller 122 and the idler roller 124 each have the same diameter, but the rollers 120, 122, 124 are not limited to having the same diameter.

The drive roller 120 is mounted to the cradle arm 104 at a location that permits a portion of the drive roller 120 to protrude beyond the cradle arm peripheral edge 110 in a direction toward the base plate 3. In the illustrated embodiment, the drive roller 120 is mounted to the cradle arm 104 at a location that is aligned with an axis that is parallel to the z axis and passes through the workpiece longitudinal axis 34. In addition, the drive roller 12 is mounted to the cradle arm at a location that permits a contact surface 121 of the drive roller 120 to be in direct contact with the base plate 3. By this configuration, movement of the cradle arm 104 relative to the base plate 3 in a direction in a direction parallel to the Y axis results in rotation of the drive roller 120 about its pin 126.

The driven roller 122 is mounted to the cradle arm 104 at a location that permits a portion of the driven roller 122 to protrude beyond the cradle arm peripheral edge 110 in a direction away from the base plate 3 and toward the workpiece 30. In use, the workpiece 30 rests on the driven roller 122, whereby a contact surface 123 of the driven roller 122 is in direct contact with the workpiece 30. In addition, the driven roller 122 is mounted to the cradle arm 104 at a location that permits the contact surface 123 of the driven roller 122 to be in direct contact with the contact surface 121 of the drive roller 120. By this configuration, rotation of the drive roller 120 results in rotation of the driven roller 122 about its pin 126.

The idler roller 124 is mounted to the cradle arm 104 at a location that permits a portion of the idler roller 124 to protrude beyond the cradle arm peripheral edge 110 in a direction toward the workpiece 30. In use, the workpiece 30 rests on the idler roller 124, whereby a contact surface 125 of the idler roller 124 is in direct contact with the workpiece 30. The idler roller 124 is mounted to the cradle arm 104 at a location that is spaced apart from the driven roller 122, whereby the workpiece 30 is supported by both the idler roller 124 and the driven roller at locations that are spaced apart along a circumference of the workpiece 30. In the illustrated embodiment, the spacing of the idler roller 124 from the driven roller 122 is such that an angle of about 90 degrees is provided between a contact point of the idler roller 124 with the workpiece 30 and a contact point of the driven roller 122 with the workpiece 30.

Since the contact surface 121 of the drive roller 120 contacts the base plate 3, the drive roller 120 is rotated in a first direction about an axis parallel to the X axis by translation of the cradle 102 in a direction parallel to the Y axis. The translation of the cradle 102 is achieved by movement of the first support carriage 62(1) along the first fixed rail 61(1).

Since the contact surface 123 of the driven roller 122 contacts the contact surface 121 of the drive roller 120, the rotation of the drive roller 120 in the first direction about the axis parallel to the X axis results in rotation of the driven roller 122 in a second direction about an axis parallel to the X axis, where the second direction is opposed to the first direction. In addition, since the contact surface 123 of the driven roller 122 contacts the surface of the workpiece 30, the rotation of the driven roller 122 in the second direction about the axis parallel to the X axis results in rotation of the workpiece 30 about its longitudinal axis 34, which is also parallel to the X axis.

Thus, translation of the first support carriage 62(1) in a direction parallel to the Y axis results in movement of the surface of the workpiece 30 relative to the cutting bean 23'.

Since the laser cutter 1 is configured to both provide a cutting head 80 that applies a cutting beam 23' to a side surface of the workpiece 30, and provide a fixture 100 that supports the workpiece 30 and rotates the workpiece 30 about the workpiece longitudinal axis 34, the laser cutter 1 is able to cut objects having a dimension that is greater than a distance of the cutting head 80 from the base plate 3 in a direction parallel to the Z axis.

Since the workpiece 30 does not roll directly on the base plate 3, and instead rolls on the driven and idler rollers 122, 124, there is not a one-to-one correspondence between an arc length of the workpiece circumference and the translation distance of the first support carriage 62(1) in a direction parallel to the Y axis. This situation may be addressed in various ways, as required by the specific application. For example, in some embodiments, the set of computer implemented instructions may be configured to use the diameter of the workpiece 30 as a factor in scaling the image to be cut, and to use an algorithm to convert the difference in arc length to a translation distance in a direction parallel to the Y axis.

In the illustrated embodiment, the fixture 100 includes a single cradle arm 104 supported on the bracket 140. However, the fixture 100 is not limited to this configuration. For example, in other embodiments, the bracket 140 may support two or more cradle arms 104 that are spaced apart along the bracket 140 so as to provide support to the workpiece 30 at multiple locations.

In the illustrated embodiment, the drive roller 120 is rotated as the cradle 102 and first support carriage 62(1) is translated relative to the base plate 3, which in turn causes the driven roller 122 to rotate the workpiece 30. However, in other embodiments, the workpiece 30 may be rotated by driving the drive roller 120 or driven roller 122 directly, for example via a belt drive. Since the actuation system 70 used in the illustrated embodiment employs belt drives to actuate the first and second support carriages 62(1), 62(2) and the cutting head 80, implementation of an additional belt drive for actuation of the appropriate roller 120, 122 is a simple extension of the actuation system 70. In still other embodiments, the workpiece 30 may be rotated by replacing the driven roller 122 with a pinion that is driven by a rack.

Figure 10:
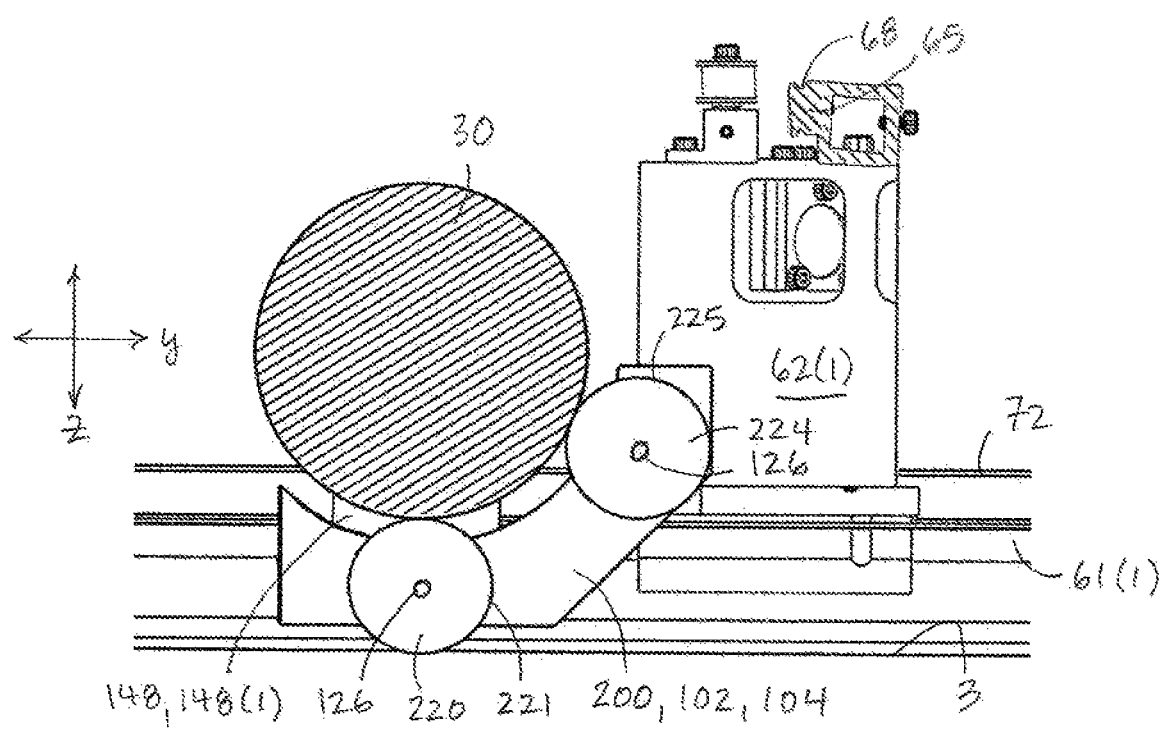
FIG. 10 is a side cross sectional view of an alternative fixture.

Referring to FIG. 10, an alternative embodiment fixture 200 is similar to the fixture 100 described above with respect to FIGS. 1-9 in that it includes the bracket 140 and cradle arm 104, and common elements are referred to with common reference numbers. The fixture 200 of FIG. 10 differs from the previous embodiment in that the fixture 200 includes a drive roller 220 and an idler roller 224, and omits the driven roller 122.

The drive roller 220 is larger in diameter than the driver roller 120 of the previous embodiment. The drive roller 220 is mounted to the cradle arm 104 at a location that permits a first portion of the drive roller 220 to protrude beyond the cradle arm peripheral edge 110 in a direction toward the base plate 3, and an opposed, second portion of the drive roller 220 to protrude beyond the cradle arm peripheral edge 110 in a direction toward the workpiece 30. In the illustrated embodiment, the drive roller 220 is mounted to the cradle arm 104 at a location that is aligned with an axis that is parallel to the z axis and passes through the workpiece longitudinal axis 34. In use, a contact surface 221 of the drive roller 220 is in direct contact with both the base plate 3 and the workpiece 30. By this configuration, the drive roller 220 serves as both the drive roller and driven roller, and movement of the cradle arm 104 relative to the base plate 3 in a direction in a direction parallel to the Y axis results in rotation of the drive roller 220 about its pin 126 and rotation of the workpiece 30 about its longitudinal axis 34.

The idler roller 224 is mounted to the cradle arm 104 at a location that permits a portion of the idler roller 224 to protrude beyond the cradle arm peripheral edge 110 in a direction toward the workpiece 30. In the illustrated embodiment, the idler roller 224 is larger in diameter than the idler roller 124 of the previous embodiment and has the same diameter as the drive roller 220, but is not limited to this configuration. In use, the workpiece 30 rests on the idler roller 224, whereby a contact surface 225 of the idler roller 224 is in direct contact with the workpiece 30. The idler roller 224 is mounted to the cradle arm 104 at a location that is spaced apart from the drive roller 220, whereby the work-piece 30 is supported by both the idler roller 224 and the drive roller 220 at locations that are spaced apart along a circumference of the workpiece 30. In the illustrated embodiment, the spacing of the idler roller 224 from the drive roller 220 is such that an angle of about 80 degrees is provided between a contact point of the idler roller 224 with the workpiece 30 and a contact point of the drive roller 220 with the workpiece 30.

Since the contact surface 221 of the drive roller 220 contacts the base plate 3, the drive roller 220 is rotated in a first direction about an axis parallel to the X axis by translation of the cradle 102 in a direction parallel to the Y axis. The translation of the cradle 102 is achieved by movement of the first support carriage 62(1) along the first fixed rail 61(1).

Since the contact surface 221 of the drive roller 220 contacts the workpiece 30, the rotation of the drive roller 220 in the first direction about the axis parallel to the X axis results in rotation of the workpiece 30 about its longitudinal axis 34, which is also parallel to the X axis.

Thus, translation of the first support carriage 62(1) in a direction parallel to the Y axis results in movement of the surface of the workpiece 30 relative to the cutting beam 23'.

Figure 11:
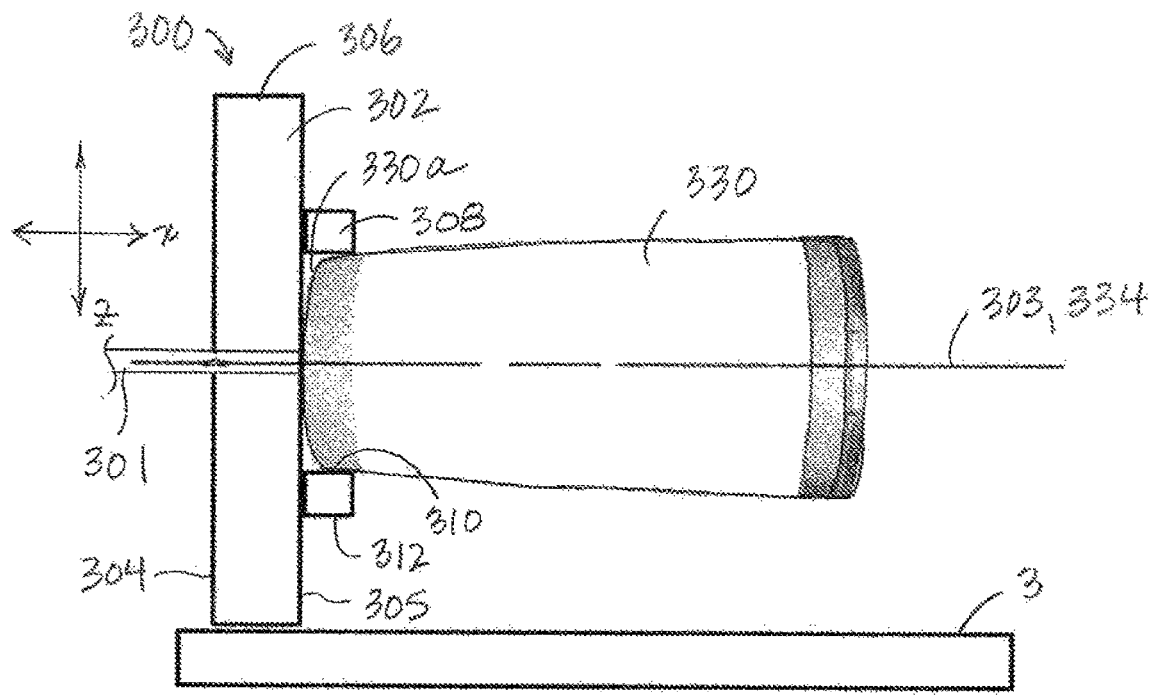
FIG. 11 is a side view of another alternative fixture, the fixture shown supporting a cup.
Figure 12:
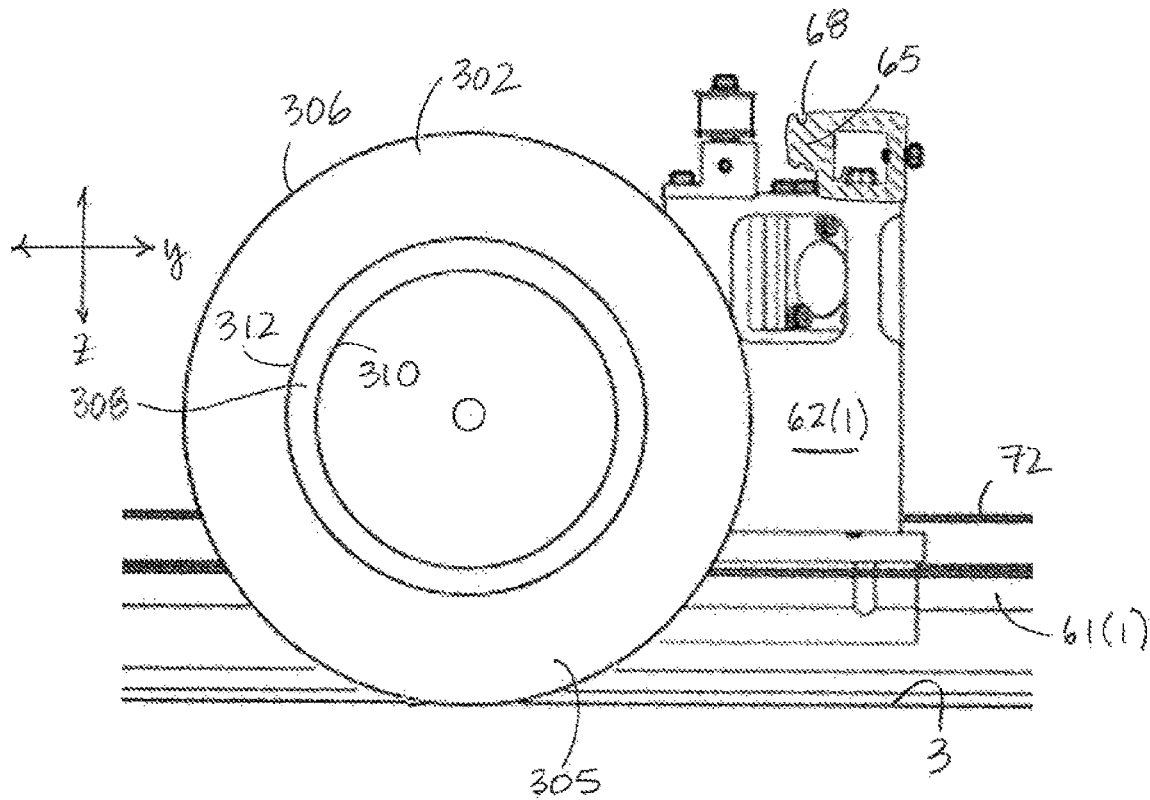
FIG. 12 is an end view of the fixture of claim 11.

Referring to FIGS. 11 and 12, an alternative fixture 300 is supported on the first support carriage 62(1). The fixture 300 supports a generally cylindrical workpiece 330, for example a cup, within the laser cutter housing 2 in such a way that the longitudinal axis 334 of the workpiece 330 is oriented parallel to the X axis, and the workpiece 330 overlies, and is spaced apart from, the base plate 3. In addition, the fixture 300 supports the workpiece 330 in such a way that the workpiece 330 can be selectively rotated about its longitudinal axis 334, as discussed further below.

The fixture 300 includes a roller 302 that supports the workpiece 330 in the above-described configuration, and a bracket 301 that connects the roller 302 to the first support carriage 62(1) in such a way that the roller 302 is freely rotatable about an axis 303 that is parallel to the X axis. The roller 302 is a generally disc shaped member that has an outer diameter that is greater than an outer diameter of the workpiece 330. The roller 302 includes a carriage-facing surface 304, a workpiece-facing surface 305 that is opposed to the carriage-facing surface 304, and a peripheral edge or rim 306 that extends between the carriage-facing surface 304 and the workpiece-facing surface 305. The roller 302 is supported by the bracket 301 so that the rim 306 is in contact with the base plate 3. The roller 302 includes an annular mount ring 308 that protrudes from the workpiece-facing surface. The annular mount ring 308 has an inner surface 310 that faces the rotational axis 303 of the roller 302, and an outer surface 312 that is opposed to the inner surface 310. The inner surface 310 of the mount ring 308 is dimensioned so that the inner surface 310 receives an end 330a of the workpiece 330 in a press-fit manner. When the workpiece end 330a is press fit into the mount ring 308, the workpiece 330 is supported on the roller 302. In this configuration, the longitudinal axis 334 of the workpiece 330 is oriented parallel to the X axis, and the workpiece 330 overlies, and is spaced apart from, the base plate 3.

Since the rim 306 contacts the base plate 3, the roller 302 is rotated about the rotational axis 303 by movement of the first support carriage 62(1) along the first fixed rail 61(1), and the workpiece 330 is also rotated about the workpiece longitudinal axis 334. Thus, translation of the first support carriage 62(1) in a direction parallel to the Y axis results in movement of the surface of the workpiece 330 relative to the cutting beam 23'.

Since the fixture 300 engages an outer surface of an end of the workpiece 330, the fixture 300 can accommodate a workpiece that is generally, but not precisely, cylindrical. For example, in the illustrated embodiment, the cup 330 is slightly tapered along its longitudinal axis 334 and has slightly rounded edges.

Figure 13:
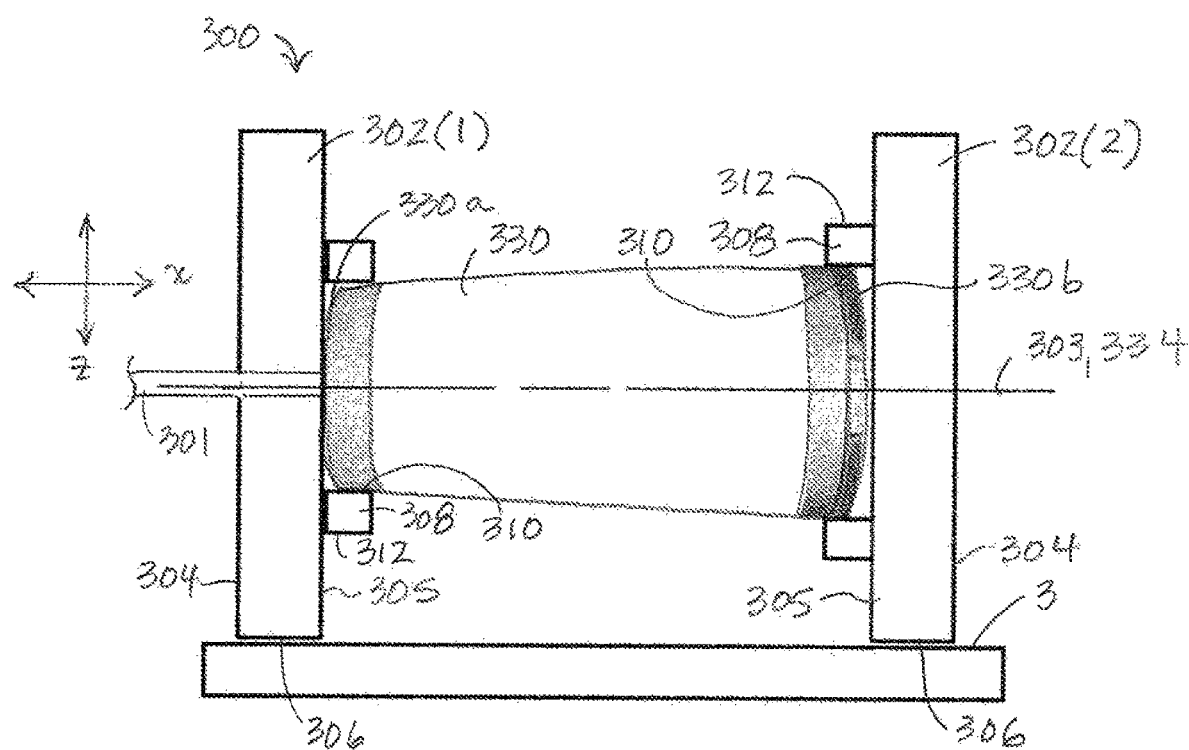
FIG. 13 is a side view of a variation of the fixture of claim 11, the fixture shown supporting a cup.

Referring to FIG. 13, in some embodiments, the fixture 300 includes two rollers 302(1), 302(2). The first roller 302(1) corresponds to the roller 302 described above with respect to FIGS. 1 and 12. The second roller 302(2) is similar to the first roller 302(1), and common reference numbers are used to refer to common elements. The second roller 302(2) differs from the first roller 302(1) in that 1) the dimensions of the mount ring 308 are different to accommodate the dimensions of the second end 330b of the workpiece 330 (in the illustrated example, the dimensions are increased), and 2) the orientation of the second roller 302(2) is opposite that of the first roller 302(1) so that the mount ring 308 of the second roller 302(2) faces the mount ring 308 of the first roller 302(1). In the illustrated embodiment, the second roller 302(2) is connected to the first roller 302(1) via the workpiece 330. In other words, in the illustrated embodiment, there is no structure supporting the second roller 302(2) other than the workpiece 330. However, the fixture 300 is not limited to this configuration. For example, in other embodiments, a connection arm (not shown) may extend between the first roller 302(1) and the second roller 302(2). The connection arm may be fixed in length, or may be adjustable in length to accommodate workpieces 330 of various lengths.

In use, the first end 330a of the workpiece 330 is press fit into the mount ring 308 of the first roller 302(1), and the second end 330b of the workpiece 330 is press fit into the mount ring 308 of the second roller 302(2), whereby the workpiece 330 is supported on the fixture 300. In this configuration, the longitudinal axis 334 of the workpiece 330 is oriented parallel to the X axis, and the workpiece 330 overlies, and is spaced apart from, the base plate 3.

Since the rims 306 of each roller 302(1), 302(2) contact the base plate 3, the rollers 302(1), 302(2) are rotated in a first direction about the rotational axis 303 by movement of the first support carriage 62(1) along the first fixed rail 61(1). Thus, translation of the first support carriage 62(1) in a direction parallel to the Y axis results in movement of the surface of the workpiece 330 relative to the cutting beam 23'.

In the embodiments of the fixture 300 illustrated in FIGS. 11-13, the outer surface of the workpiece 330 is engaged with an inner surface of the mount ring 308. However, it is contemplated that in other embodiments in which the workpiece 330 is hollow, the workpiece may be mounted in the fixture 300 by a press fit engagement between the inner surface of the workpiece 330 and the outer surface 312 of the mount ring 308.

The laser cutter 1 described above corresponds to one implementation of a CNC machine. While some features are described in the context of the laser cutter 1, the description is not intended to be limited to a laser cutter, and many of the features described above can be implemented in other types of CNC machines, such as, for example, a lathe, engraver, 3D-printer, milling machine, drill press, saw, etc.

Selective illustrative embodiments of the laser cutter are described above in some detail. It should be understood that only structures considered necessary for clarifying certain features of the laser cutter have been described herein. Other conventional structures, and ancillary and auxiliary components of the laser cutter, are assumed to be known and understood by those skilled in the art. Moreover, while a working example of the laser cutter has been described above, the laser cutter is not limited to the working example described above, but various design alterations may be carried out without departing from the laser cutter as set forth in the claims.

We claim:

1. A desktop laser cutter configured to remove material from a workpiece, the desktop laser cutter comprising:
   a laser that is configured to emit a beam of electromagnetic radiation;
   a cutting head which receives the beam emitted from the laser, and emits a cutting beam,
   a gantry that supports the cutting head for movement along a first axis and a second axis that is perpendicular to the first axis,
   at least one motor that is connected to the gantry and is configured to actuate elements of the gantry in such a way the cutting head is moved along at least one of the first axis and the second axis; and
   a laser cutter housing including a base plate that is parallel to the first axis and the second axis, and a sidewall that surround the base plate,
   wherein
   the laser, the cutting head, the gantry, and the actuation system are disposed in the laser cutter housing,
   the cutting head is configured to emit the cutting beam in a direction parallel to the base plate, and
   the gantry comprises:
      a fixed rail, the fixed rail extending linearly along the first axis;
      a support carriage that is mounted on the fixed rail and configured to translate along the fixed rail; and
      a movable rail that is supported on the support carriage so as to extend linearly along the second axis, the movable rail supporting the cutting head in such a way that the cutting head can translate along the movable rail, and wherein the desktop laser cutter comprises a fixture that is supported on the support carriage, and the fixture is configured to support the workpiece within the laser cutter housing.

2. The desktop laser cutter of claim 1, wherein the fixture comprises a roller, the workpiece is in direct contact with the roller, and rotation of the roller results in rotation of the workpiece.

3. The desktop laser cutter of claim 1, wherein the fixture is configured to support a cylindrical workpiece having a longitudinal axis, and when the cylindrical workpiece is supported by the fixture, the cylindrical workpiece is supported in such a way that the cylindrical workpiece can be rotated about the longitudinal axis.

4. The machine of claim 1, wherein the fixture is configured to support a workpiece that is cylindrical relative to the cutting head in such a way that
   a) a longitudinal axis of the workpiece extends in a direction parallel to the base plate, and
   b) the workpiece is rotated about the longitudinal axis an amount that is a function of a displacement of the support carriage in a direction parallel to the first axis.

5. The desktop laser cutter of claim 1, wherein the fixture includes a cradle that is configured to engage with the workpiece when the workpiece is supported on the fixture, and a bracket that connects the cradle to the support carriage, the cradle including a cradle arm that extends about a portion of a surface of the workpiece and is disposed between the workpiece and the base plate.

6. The desktop laser cutter of claim 5, wherein the cradle includes a drive roller and an idler roller that are each supported for rotation on the cradle arm, and the drive roller is mounted to the cradle arm at a location such that
   a) a portion of the drive roller protrudes beyond a cradle arm peripheral edge in a direction toward the base plate, and
   b) a contact surface of the drive roller is in direct contact with the base plate, whereby movement of the cradle arm relative to the base plate results in rotation of the drive roller.

7. The desktop laser cutter of claim 6, wherein the cradle includes a driven roller, and the driven roller is mounted to the cradle arm at a location such that
   a) a portion of the driven roller protrudes beyond the cradle arm peripheral edge in a direction away from the base plate, and a contact surface of the driven roller is in direct contact with the workpiece when a workpiece is supported by the fixture, and
   b) the contact surface of the driven roller is in direct contact with the contact surface of the driver roller whereby rotation of the drive roller results in rotation of the driven roller.

8. The desktop laser cutter of claim 6, wherein
the idler roller is mounted to the cradle arm at a location such that
   a) the idler roller is spaced apart from the driven roller, and
   b) a portion of the idler roller protrudes beyond the cradle arm peripheral edge in a direction away from the base plate, and a contact surface of the idler roller is in direct contact with the workpiece when the workpiece is supported by the fixture.

9. The desktop laser cutter of claim 1, wherein
the fixture is configured to rotatably support the workpiece,
the fixture includes
   a cradle,
   a drive roller that is rotatably mounted on the cradle and contacts the base plate,
   a driven roller that is rotatably mounted on the cradle, contacts the drive roller and is configured to contact the workpiece when the workpiece is supported on the fixture, and
   an idler roller that is rotatably mounted on the cradle at a location spaced apart from the driven roller, the idler roller configured to contact the workpiece when the workpiece is supported on the fixture,
and wherein the fixture is configured so that
   translation of the support carriage in a direction parallel to the first axis results in rotation of the drive wheel,
   rotation of the drive wheel results in rotation of the driven wheel, and
   rotation of the driven wheel results in rotation of the workpiece when the workpiece is supported on the fixture.

10. A desktop laser cutter configured to remove material from a workpiece, the desktop laser cutter comprising:
   a laser that is configured to emit a beam of electromagnetic radiation;
   a cutting head which receives the beam emitted from the laser, and emits a cutting beam,
   a gantry that supports the cutting head for movement along a first axis and a second axis that is perpendicular to the first axis,
   at least one motor that is connected to the gantry and is configured to actuate elements of the gantry in such a way the cutting head is moved along at least one of the first axis and the second axis; and
   a laser cutter housing including a base plate that is parallel to the first axis and the second axis, and a sidewall that surround the base plate,
wherein
   the laser, the cutting head, the gantry, and the actuation system are disposed in the laser cutter housing,
   the cutting head is configured to emit the cutting beam in a direction parallel to the base plate,
   the gantry comprises:
      a fixed optical device that is fixed relative to the laser and is configured to receive the beam emitted from the laser and redirect the beam;
      a fixed rail, the fixed rail extending linearly along the first axis;
      a support carriage that is mounted on the fixed rail and configured to translate along the fixed rail, the support carriage including a first movable optical device that is movable relative to the laser, and is configured to receive the beam emitted from the fixed optical device and redirect the beam so that it travels in a direction that is parallel to the second axis and is received by a second movable optical device; and
      a movable rail that is supported on the support carriage so as to extend linearly along the second axis,
   the cutting head is supported on, and configured to translate relative to, the movable rail, the cutting head comprising the second movable optical device, and
   the second movable optical device is configured to emit the cutting beam.

11. The desktop laser cutter of claim 10, wherein the second movable optical device includes
   a first mirror that receives the beam emitted from the first movable optical device and deflects the beam emitted from the first movable optical device to a direction perpendicular to the both the first axis and the second axis, and a second mirror that receives the beam from the first mirror and emits the cutting beam, the second mirror configured to emit the cutting beam in such a way that the cutting beam travels in a direction parallel to the first axis.

12. The desktop laser cutter of claim 11, wherein the second movable optical device includes a lens that is configured to focus the cutting beam to a predetermined focal length.

13. The desktop laser cutter of claim 10, wherein the cutting head comprises:
   a mounting body that is coupled to the movable rail in such a way that the mounting body is slideable along the movable rail; and
   an adjustment plate that supports at least a portion of the second movable optical device, wherein the adjustment plate is supported on the mounting body in such a way that position of the adjustment plate relative to the mounting body can be adjusted along an axis that is parallel to a third axis, where the third axis is perpendicular to the first axis and the second axis.

14. The desktop laser cutter of claim 13, wherein the movable rail includes a contoured portion having a shape configured to engage with a first coupling portion of the mounting body in such a way that the mounting body is retained on the movable rail and is slidable along the movable rail.

15. The desktop laser cutter of claim 13, wherein
   the adjustment plate includes a slide portion,
   the mounting body includes a coupling portion, and
   the coupling portion includes a groove that receives the slide portion, and a lock that is configured to selectively engage the slide portion such that when the lock is engaged, the lock retains the slide portion in the groove, and when the lock is disengaged, the slide portion is movable relative to the groove.

16. A computer numerically controlled machine that is configured to use a laser in a subtractive process to remove material from a cylindrical workpiece, the machine comprising:
   a housing;
   the laser, the laser disposed in the housing and configured to emit a beam of electromagnetic radiation;
   a cutting head that is disposed in the housing and configured to receive the beam emitted from the laser and emit a cutting beam that performs the subtractive process;
   a gantry that is disposed in the housing, the gantry configured to support the cutting head and move the cutting head within a plane defined by an x axis and a y axis, where the x axis is perpendicular to the y axis; and
   a fixture that is supported on the gantry, the fixture configured to support the workpiece within the housing in such a way that the workpiece is positioned in a path of the cutting beam and can be rotated relative to the cutting head,
wherein
   the cutting head includes an optical device that directs the cutting beam so that it travels in a direction parallel to the plane.

17. The machine of claim 16, wherein the fixture comprises a roller, the workpiece is in direct contact with the roller, and rotation of the roller results in rotation of the workpiece.

18. The machine of claim 16, wherein the fixture includes a cradle that is configured to engage with the workpiece when the workpiece is supported on the fixture, and a bracket that connects the cradle to the support carriage, the cradle including a cradle arm that extends about a portion of a surface of the workpiece and is disposed between the workpiece and the base plate.

19. The machine of claim 18, wherein the cradle includes a drive roller and an idler roller that are each supported for rotation on the cradle arm, and
   the drive roller is mounted to the cradle arm at a location such that
   a) a portion of the drive roller protrudes beyond a cradle arm peripheral edge in a direction toward the base plate, and
   b) a contact surface of the drive roller is in direct contact with the base plate, whereby movement of the cradle arm relative to the base plate results in rotation of the drive roller.

20. The machine of claim 16, wherein the fixture includes
   a cradle,
   a drive roller that is rotatably mounted on the cradle and contacts the housing,
   a driven roller that is rotatably mounted on the cradle, contacts the drive roller and is configured to contact the workpiece when the workpiece is supported on the fixture, and
   an idler roller that is rotatably mounted on the cradle at a location spaced apart from the driven roller, the idler roller configured to contact the workpiece when the workpiece is supported on the fixture,
   and wherein the fixture is configured so that
   translation of the support carriage in a direction parallel to the first axis results in rotation of the drive wheel,
   rotation of the drive wheel results in rotation of the driven wheel, and
   rotation of the driven wheel results in rotation of the workpiece when the workpiece is supported on the fixture.

21. The machine of claim 16, wherein the optical device includes a first mirror that receives the beam emitted from the laser and deflects the beam emitted from the laser to a direction perpendicular to the plane, and a second mirror that receives the beam from the first mirror and emits the cutting beam, the first mirror configured to emit the cutting beam in such a way that the cutting beam travels in a direction parallel to the plane and toward the workpiece.

22. The machine of claim 21, wherein a position of the second mirror relative to the cutting head can be adjusted along a z axis, where the z axis is perpendicular to the x axis and the y axis.

23. The machine of claim 16, wherein the fixture is configured to support the workpiece relative to the cutting head in such a way that a) a longitudinal axis of the workpiece extends in a direction parallel to the plane, and b) the workpiece is rotated about the longitudinal axis an amount that is a function of an amount of movement of the cutting head along the y axis.

24. The machine of claim 16, wherein the gantry includes
   a fixed rail that is fixed relative to the laser and extends linearly along the y axis,
   a support carriage that is mounted on the fixed rail and configured to translate along the fixed rail, the support carriage including a second optical device that is disposed in the path of the beam emitted from the laser, and is configured to direct the beam to the first optical device; and a movable rail that is supported on the support carriage so as to extend linearly along the x axis, wherein the cutting head is mounted on the movable rail and is configured to translate along the movable rail, and the workpiece is supported on the support carriage by the fixture in such a way that a) a longitudinal axis of the workpiece extends in a direction parallel to the plane, and b) movement of the support carriage along the y axis causes a rotation of the workpiece about the longitudinal axis.

* * * * *